United States Patent
Zhang et al.

(10) Patent No.: US 12,079,579 B2
(45) Date of Patent: Sep. 3, 2024

(54) INTENTION IDENTIFICATION MODEL LEARNING METHOD, APPARATUS, AND DEVICE

(71) Applicant: Huawei Technologies Co., Ltd., Shenzhen (CN)

(72) Inventors: Qing Zhang, Beijing (CN); Wei Yang, Shenzhen (CN); Yifan Xiao, Beijing (CN); Lianghe Zhang, Beijing (CN); Shangling Jui, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 685 days.

(21) Appl. No.: 17/277,455

(22) PCT Filed: Sep. 19, 2018

(86) PCT No.: PCT/CN2018/106468
§ 371 (c)(1),
(2) Date: Mar. 18, 2021

(87) PCT Pub. No.: WO2020/056621
PCT Pub. Date: Mar. 26, 2020

(65) Prior Publication Data
US 2021/0350084 A1    Nov. 11, 2021

(51) Int. Cl.
*G06F 40/30*      (2020.01)
*G06F 18/214*     (2023.01)
(Continued)

(52) U.S. Cl.
CPC ........... *G06F 40/30* (2020.01); *G06F 18/214* (2023.01); *G06F 40/35* (2020.01); *G06N 20/20* (2019.01)

(58) Field of Classification Search
CPC ........ G06F 40/30; G06F 18/214; G06F 40/35; G06F 40/284; G06N 20/20
See application file for complete search history.

(56) References Cited

U.S. PATENT DOCUMENTS

| | | | |
|---|---|---|---|
| 10,943,583 B1* | 3/2021 | Gandhe | G10L 15/183 |
| 2015/0052098 A1* | 2/2015 | Kveton | G06Q 50/01 |
| | | | 706/52 |

(Continued)

FOREIGN PATENT DOCUMENTS

| | | |
|---|---|---|
| CN | 102521599 A | 6/2012 |
| CN | 106407333 A | 2/2017 |

(Continued)

OTHER PUBLICATIONS

Ilievski, V., et al., "Goal-Oriented Chatbot Dialog Management Bootstrapping with Transfer Learning," Arxiv. Org, Cornell University Library, Olin Library Cornell University Ithaca, NY 14853, Jul. 24, 2018, XP081241652, 7 pages.

(Continued)

*Primary Examiner* — Daniel C Washburn
*Assistant Examiner* — Athar N Pasha
(74) *Attorney, Agent, or Firm* — Conley Rose, P.C.

(57) ABSTRACT

An intention identification model learning method includes receiving positive data that corresponds to a first skill, generating, based on the positive data that corresponds to the first skill, negative data that corresponds to the first skill, determining a second skill similar to the first skill, obtaining data that corresponds to each second skill, generating a second base model based on the data that corresponds to the second skill and a first base model stored on the server, and performing learning based on the second base model, the positive data, and the negative data that correspond to the first skill, and generating an intention identification model.

20 Claims, 8 Drawing Sheets

(51) Int. Cl.
  *G06F 40/35* (2020.01)
  *G06N 20/20* (2019.01)

(56) References Cited

U.S. PATENT DOCUMENTS

| | | | |
|---|---|---|---|
| 2016/0188574 A1 | 6/2016 | Homma et al. | |
| 2017/0270912 A1* | 9/2017 | Levit | G10L 15/10 |
| 2018/0121810 A1 | 5/2018 | Guo et al. | |
| 2018/0268584 A1* | 9/2018 | Bobovich | G06V 10/764 |
| 2019/0138595 A1* | 5/2019 | Galitsky | G06F 40/35 |
| 2019/0341052 A1* | 11/2019 | Allibhai | G06N 3/045 |
| 2020/0065384 A1* | 2/2020 | Costello | G06N 3/04 |
| 2020/0082272 A1* | 3/2020 | Gu | G06N 3/045 |
| 2020/0251117 A1* | 8/2020 | Xu | G10L 25/51 |

FOREIGN PATENT DOCUMENTS

| | | |
|---|---|---|
| CN | 106446951 A | 2/2017 |
| CN | 106528531 A | 3/2017 |
| CN | 107515857 A | 12/2017 |
| CN | 108090520 A | 5/2018 |
| CN | 107491531 B | 5/2019 |

OTHER PUBLICATIONS

"Ensemble learning-Wikipedia," Sep. 15, 2018, XP055832584, Retrieved from the Internet: URL:https://en.wikipedia.org/w/index.phptitle=Ensemble_learningandoldid=859622195#0verview, 12 pages.

* cited by examiner

INTENTION IDENTIFICATION MODEL LEARNING METHOD, APPARATUS, AND DEVICE

CROSS-REFERENCE TO RELATED APPLICATIONS

This application is a U.S. National Stage of International Patent Application No. PCT/CN2018/106468 filed on Sep. 19, 2018, which is hereby incorporated by reference in its entirety.

TECHNICAL FIELD

This application relates to the field of communications technologies, and in particular, to an intention identification model learning method, an apparatus, and a device.

BACKGROUND

A human-machine dialog system, or referred to as a human-machine dialog platform, a chatbot (chatbot), or the like, is a new-generation human-machine interaction interface. Specifically, the human-machine dialog system is classified into an open-domain (open-domain) chatbot and a task-oriented (task-oriented) chatbot based on related fields.

The task-oriented chatbot can provide a terminal user with services such as meal ordering, ticket booking, and taxi hailing. For example, a provider of these services enters some training data (for example, a user statement, which may also be referred to as a corpus) that corresponds to a function A into a server in advance. The server trains, based on the entered training data by using an ensemble learning (Ensemble Learning) method, a model that corresponds to the function A. The model that corresponds to the function A may be used to predict a new user statement entered by the terminal user, to determine a user intention, in other words, whether the server provides a service that corresponds to the function A for the terminal user.

It should be noted that, in an ensemble learning process of the server, the server learns, by using some preset base learners (which may also be referred to as base models), the training data entered by the service provider, and integrates, according to a rule, models obtained through training by the base learners, to obtain a model which is more accurate than that obtained through training by a single base learner.

It can be learned that richness and accuracy of the training data entered by the service provider and rationality of the preset base model directly affect accuracy of the model obtained through ensemble learning. If the entered training data is insufficient, or the entered training data is inaccurate, or the base model preset on the server is improper, the accuracy of the model obtained through ensemble learning is severely affected. This further affects accuracy when the chatbot executes a specific task, and affects terminal user experience.

SUMMARY

This application provides an intention identification model learning method, an apparatus, and a device, to improve accuracy of an intention identification model in a human-machine dialog system, improve accuracy of executing a task by the human-machine dialog system, and improve user experience.

According to a first aspect, an embodiment of this application provides an intention identification model learning method. The method includes: receiving, by a server, positive data that corresponds to each intention in a first skill and that is entered by a skill developer; generating, by the server based on the positive data that corresponds to each intention in the first skill, negative data that corresponds to each intention in the first skill; obtaining, by the server, training data that corresponds to a second skill, where the second skill is similar to the first skill, and there is at least one second skill; performing learning by the server based on the training data that corresponds to the second skill and based on a preset first basic model, to generate a second basic model, where there is at least one second basic model; and performing learning by the server based on the positive data that corresponds to each intention in the first skill, based on the negative data that corresponds to each intention in the first skill, and based on the second base model, and to generate an intention identification model.

It can be learned from the foregoing that, in this embodiment of this application, the negative data is introduced when the intention identification model is trained. This helps reduce a case in which misidentification is caused because only positive data is trained, and helps improve accuracy of an intention identification model obtained through learning. In addition, when the intention identification model is trained, the training data of the similar voice skill is further introduced, to learn more base models, enrich types of the base models, and improve accuracy of the intention identification model obtained through training.

In a possible implementation, the generating, by the server based on the positive data that corresponds to each intention in the first skill, negative data that corresponds to each intention in the first skill includes: extracting, by the server for each intention in the first skill, a keyword that corresponds to each intention in the first skill, where the keyword is a key feature that affects a weight of the first base model; and combining keywords that correspond to different intentions in the first skill, or combining keywords that correspond to different intentions with words that are unrelated to the first skill, and determining combined words as negative data that corresponds to the different intentions.

It should be noted that the foregoing keywords are significant features that are most likely to affect a feature weight of classification (intention identification). In the prior art, a reason for misidentification is that a significant feature of another type (another intention) highly overlaps a significant feature of this type (this intention). For example, an intention 1 indicates to start an app, and an intention 2 indicates to close an app. The "app" in the intention 1 and the intention 2 is a significant feature of a high frequency, but are not a significant feature of each type. However, if the significant feature of a high frequency is still used during classification, misidentification is easily caused. Therefore, in this embodiment of this application, a weight of the significant feature included in each type (intention) is reduced during classification, to improve accuracy.

In a possible implementation, the generating, by the server based on the positive data that corresponds to each intention in the first skill, negative data that corresponds to each intention in the first skill further includes: determining, by the server based on a classification of the first skill, a first set from all sets of the training data stored on the server, where the training data in the first set includes the negative data that corresponds to each intention in the first skill, and the training data includes the positive data and the negative data; sampling a preset quantity of training data from the first set; and determining, through a manual annotation and/or according to a clustering algorithm from the training data obtained through sampling, the negative data that corresponds to each intention in the first skill.

In a possible implementation, the obtaining, by the server, training data that corresponds to a second skill includes: determining, by the server, the second skill based on the classification of the first skill and/or the positive data of the first skill; and obtaining, through a sharing layer, the training data that corresponds to the second skill.

When the intention identification model is trained, the training data of the similar voice skill is further introduced. This helps resolve a problem that it is difficult to obtain a relatively accurate intention identification model through learning because a developer of the first skill enters relatively little training data.

In a possible implementation, the performing learning by the server based on the training data that corresponds to the second skill and based on a preset first basic model, to generate a second basic model includes: performing learning by the server by using a multi-task learning method based on the training data that corresponds to the second skill and based on the preset first base model, to generate the second base model.

In a possible implementation, the performing learning by the server based on the positive data that corresponds to each intention in the first skill, based on the negative data that corresponds to each intention in the first skill, and based on the second base model, to generate an intention identification model includes: performing learning by the server by using an ensemble learning method based on the positive data that corresponds to each intention in the first skill, based on the negative data that corresponds to each intention in the first skill, and based on the second base model, to generate the intention identification model.

In a possible implementation, the generating, by the server, the intention identification model specifically includes: generating, by the server, a plurality of intermediate models in a process of generating the intention identification model; and determining, by the server, that a first generated intermediate model is a fastest intention identification model, and/or determining, by the server, an optimal intention identification model after performing model selection and parameter adjustment on the plurality of intermediate models.

This embodiment of this application provides a plurality of return mechanisms, for example, returning the fastest generated intention identification model, and returning the optimal intention identification model. For example, when the fastest generated intention identification model is returned, because functions of the intention identification model can also be implemented by using the plurality of intermediate models obtained by the server 300 in a process of learning the intention identification model, the first obtained intermediate model may be determined as an intention identification model returned to a voice skill developer or a user, so that the voice skill developer or the user can obtain the intention identification model as soon as possible, to understand a function, performance, and the like of the intention identification model. For another example, when the optimal intention identification model is returned, in the process of learning the intention identification model, the server 300 may adjust parameters of the plurality of obtained intermediate models, to determine a model with relatively high accuracy as the intention identification model. This can meet various requirements of the user.

In a possible implementation, the determining, by the server, an optimal intention identification model includes: calculating, by the server, first accuracy of each intermediate model based on the positive data that corresponds to each intention in the first skill; and calculating, by the server, second accuracy of each intermediate model based on the negative data that corresponds to each intention in the first skill; and determining, by the server, the optimal intention identification model after performing model selection and parameter adjustment on the plurality of intermediate models based on the first accuracy rate, the second accuracy rate, and a weight entered by the skill developer.

In this embodiment of this application, accuracy of the model is tested by using a corpus in a voice skill, for example, the training data entered by the skill developer, and accuracy of the model is also tested by using some corpuses that are out of the voice skill and that are determined by using the server, for example, automatically generated negative data. Because more test data is introduced when the accuracy of the model is tested, a test result is more accurate. After the parameters in the model are adjusted based on the more accurate test result, the optimal intention identification model can be obtained. In other words, the technical solutions provided in this embodiment of this application help improve accuracy of the intention identification model.

According to a second aspect, an embodiment of this application provides a server, including a processor, a memory, and a communications interface. The memory is configured to store computer program code, the computer program code includes a computer instruction, and when the processor reads the computer instruction from the memory, the server is enabled to perform the following operations:

receiving, through the communications interface, positive data that corresponds to each intention in a first skill and that is entered by a skill developer; generating, based on the positive data that corresponds to each intention in the first skill, negative data that corresponds to each intention in the first skill; obtaining training data that corresponds to a second skill, where the second skill is similar to the first skill, and there is at least one second skill; performing learning based on the training data that corresponds to the second skill and based on a preset first basic model, to generate a second basic model, where there is at least one second basic model; and performing learning, based on the positive data that corresponds to each intention in the first skill, the negative data that corresponds to each intention in the first skill, and the second base model, and generating an intention identification model.

In a possible implementation, the generating, by the server based on the positive data that corresponds to each intention in the first skill, negative data that corresponds to each intention in the first skill specifically includes: extracting, by the server for each intention in the first skill, a keyword that corresponds to each intention in the first skill, where the keyword is a key feature that affects a weight of the first base model; and combining keywords that correspond to different intentions in the first skill, or combining keywords that correspond to different intentions with words that are unrelated to the first skill, and determining combined words as negative data that corresponds to the different intentions.

In a possible implementation, the generating, by the server based on the positive data that corresponds to each intention in the first skill, negative data that corresponds to each intention in the first skill further specifically includes: determining, by the server based on a classification of the first skill, a first set from all sets of the training data stored on the server, where the training data in the first set includes the negative data that corresponds to each intention in the first skill, and the training data includes the positive data and the negative data; sampling a preset quantity of training data from the first set; and determining, through a manual annotation and/or according to a clustering algorithm from the training data obtained through sampling, the negative data that corresponds to each intention in the first skill.

In a possible implementation, the obtaining, by the server, training data that corresponds to a second skill includes: determining, by the server, the second skill based on the classification of the first skill and/or the positive data of the first skill; and obtaining, through a sharing layer, the training data that corresponds to the second skill.

In a possible implementation, the performing learning by the server based on the training data that corresponds to the second skill and based on a preset first basic model, to generate a second basic model includes: performing learning by the server by using a multi-task learning method based on the training data that corresponds to the second skill and based on the preset first base model, to generate the second base model.

In a possible implementation, the performing learning by the server based on the positive data that corresponds to each intention in the first skill, based on the negative data that corresponds to each intention in the first skill, and based on the second base model, to generate an intention identification model includes: performing learning by the server by using an ensemble learning method based on the positive data that corresponds to each intention in the first skill, based on the negative data that corresponds to each intention in the first skill, and based on the second base model, to generate the intention identification model.

In a possible implementation, the generating, by the server, the intention identification model further specifically includes: generating, by the server, a plurality of intermediate models in a process of generating the intention identification model; and determining, by the server, that a first generated intermediate model is a fastest intention identification model, and/or determining, by the server, an optimal intention identification model after performing model selection and parameter adjustment on the plurality of intermediate models.

In a possible implementation, the determining, by the server, an optimal intention identification model includes: calculating, by the server, first accuracy of each intermediate model based on the positive data that corresponds to each intention in the first skill; and calculating, by the server, second accuracy of each intermediate model based on the negative data that corresponds to each intention in the first skill; and determining, by the server, the optimal intention identification model after performing model selection and parameter adjustment on the plurality of intermediate models based on the first accuracy rate, the second accuracy rate, and a weight entered by the skill developer.

According to a third aspect, a computer storage medium is provided, including a computer instruction. When the computer instruction is run on a server, the server is enabled to perform the method according to any one of the first aspect and the possible implementations of the first aspect.

According to a fourth aspect, a computer program product is provided. When the computer program product runs on a computer, the computer is enabled to perform the method in any one of the first aspect and the possible implementations of the first aspect.

DESCRIPTION OF EMBODIMENTS

The following describes the technical solutions in the embodiments of this application with reference to the accompanying drawings in the embodiments of this application. In description of the embodiments of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

Figure 1:
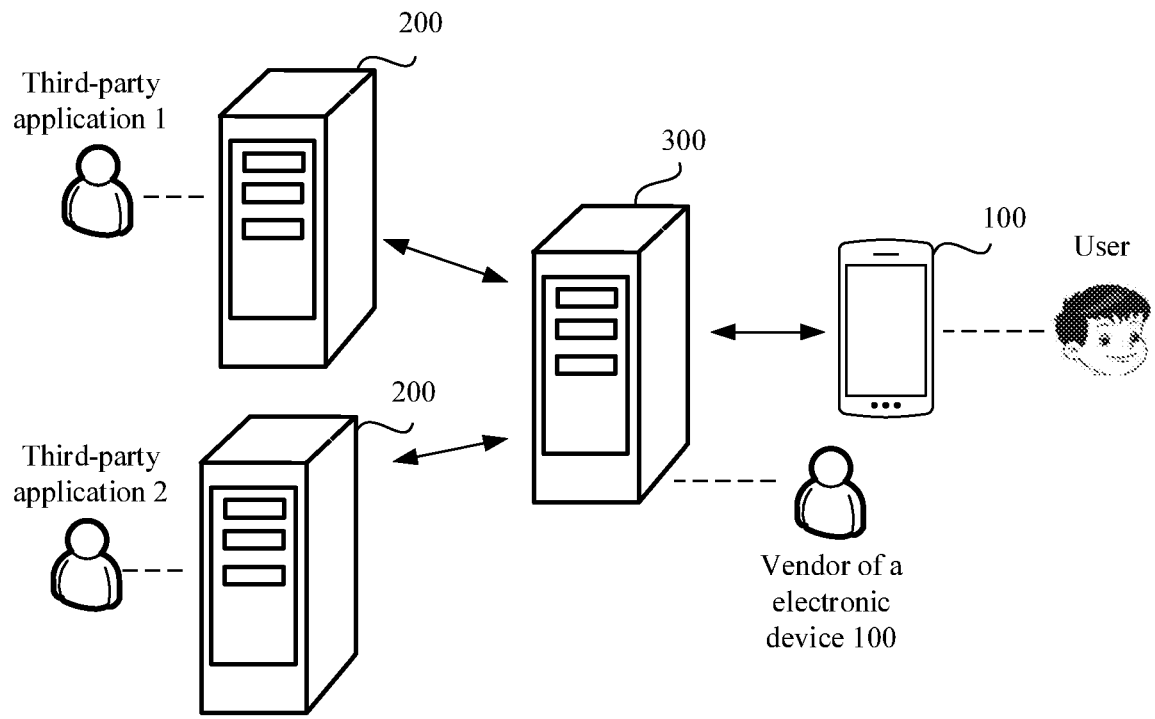
FIG. 1 is a schematic structural diagram 1 of a human-machine dialog system according to an embodiment of this application.

FIG. 1 is a schematic structural diagram of a human-machine dialog system according to an embodiment of this application. The human-machine dialog system includes one or more electronic devices 100, one or more servers 200, and one or more servers 300. A communication connection is established between the electronic device 100 and the server 300. The server 300 establishes a communication connection to each of the electronic device 100 and the server 200. Optionally, the electronic device 100 may further establish a communication connection to the server 200. The communication connection may be established through a telecommunications network (a communications network such as 3G/4G/5G), a Wi-Fi network, or the like. This is not limited in this embodiment of this application.

The electronic device 100 may be a mobile phone, a tablet computer, a personal computer (Personal Computer, PC), a personal digital assistant (personal digital assistant, PDA), a smartwatch, a netbook, a wearable electronic device, an augmented reality (Augmented Reality, AR) device, a virtual reality (Virtual Reality, VR) device, an in-vehicle device, a smart automobile, a smart speaker, a robot, and the like. A specific form of the electronic device is not particularly limited in this application.

The server 200 may be a server of a third-party application, and is configured to provide a service of the third-party application. The third-party application may be, for example, an application such as Meituan, Amazon, or DiDi taxi hailing.

The server 300 may be a server of a vendor of the electronic device 100, for example, may be a cloud server of a voice assistant on the electronic device 100. Alternatively, the server 300 may be another server. This is not limited in this embodiment of this application.

An example in which the third-party application develops a new voice application or function (which may be referred to as a voice skill) is used to describe a human-machine dialog scenario of an application of the technical solution provided in this embodiment of this application.

The voice skill may be a function that a user may request, by using the electronic device 100 and in a dialog interaction manner with the server 200 of the third-party application, the third-party application to provide one or more services in the application. This dialog interaction process is to simulate an interaction scenario in actual life of the user, so that interaction between the user and the electronic device is as natural as interaction between the user and a person.

In the dialog interaction process, each sentence spoken by the user corresponds to an intention, and is a purpose of the sentence spoken by the user. It should be noted that each voice skill includes a plurality of intentions. The server 300 matches each sentence of the user with an intention in the voice skill, to understand a requirement of the user and provide a corresponding service, for example, provide meal ordering, ticket booking, and taxi hailing.

The foregoing process of matching the sentence of the user with the intention in the voice skill is an intention identification process. The server 300 may construct an intention identification model. The intention identification model may specifically automatically identify, based on a user statement entered by the user, an intention that corresponds to the user statement.

Figure 2:
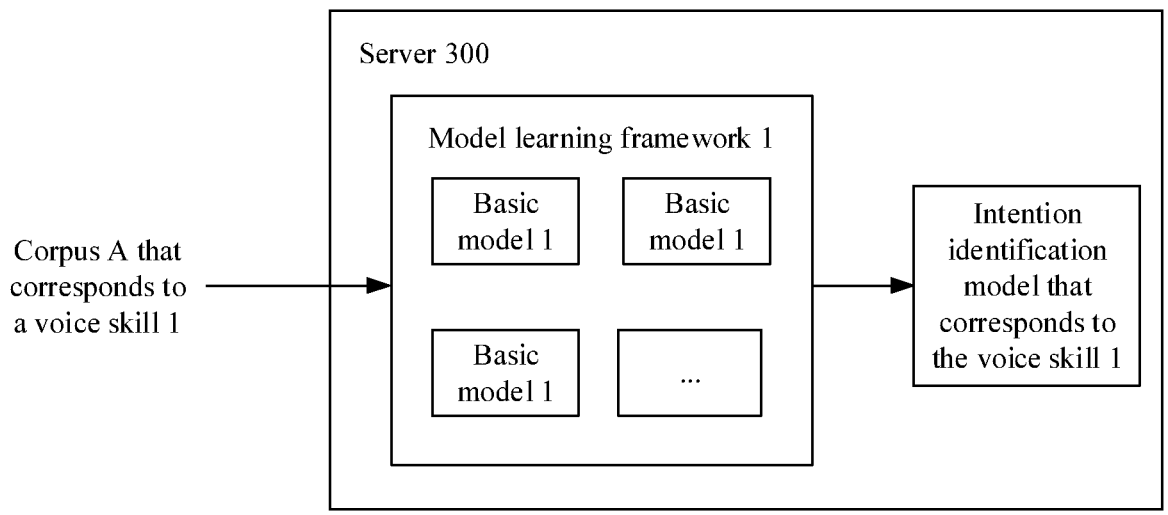
FIG. 2 is a schematic diagram of a learning method of an intention identification model in the prior art.

FIG. 2 is a schematic diagram of a process in which the server 300 trains the intention identification model. Specifically, a voice skill developer, for example, the server 200, needs to first enter some pieces of training data (which may include a correspondence between a user statement and a user intention) that corresponds to a new voice skill to the server 300. The server 300 may obtain, based on the training data by using a corresponding learning method, for example, an ensemble learning method, the intention identification model that corresponds to the new voice skill. For example, a corpus A that corresponds to a voice skill 1 is entered into a model learning framework 1 for learning, to obtain an intention identification model that corresponds to the voice skill 1. For example, the model learning framework 1 may be an ensemble learning framework. A minimum learning unit in the model learning framework is a base model, and the ensemble learning framework includes a plurality of base models, which are denoted as base models 1. These basis models 1 are different from each other. For example, different basis models 1 may belong to different models, for example, may be a support vector machine (support vector machines, SVM) model and a logistic regression (logistic regression, LR) model; or belong to a same model, but use different hyperparameters (for example, an SVM support vector machine model using a different hyperparameter C value); or belong to a same model, but use different pieces of data (for example, a same SVM model using a different original data subset).

In addition, for a specific technical solution of the ensemble learning method in this embodiment of this application, refer to the patent application No. CN 102521599A, published in the China National Intellectual Property Administration, and entitled "Mode training method based on ensemble learning and mode identifying method". Alternatively, refer to the patent application No. CN 107491531A, published in the China National Intellectual Property Administration, and entitled "Chinese network review emotion classification method based on integrated study frame", and other implementations of the ensemble learning method in the prior art. This is not limited in the embodiments of this application.

After training of the intention identification model that corresponds to the new voice skill is completed, and after receiving a statement entered by the user, the electronic device 100 sends the statement entered by the user to the server 300. The server 300 performs prediction based on the user statement and the intention identification model obtained through training, to determine a user intention that corresponds to the user statement, and further determine a third-party application on which a service is provided for the user and a specific function on the third-party application.

Figure 3:
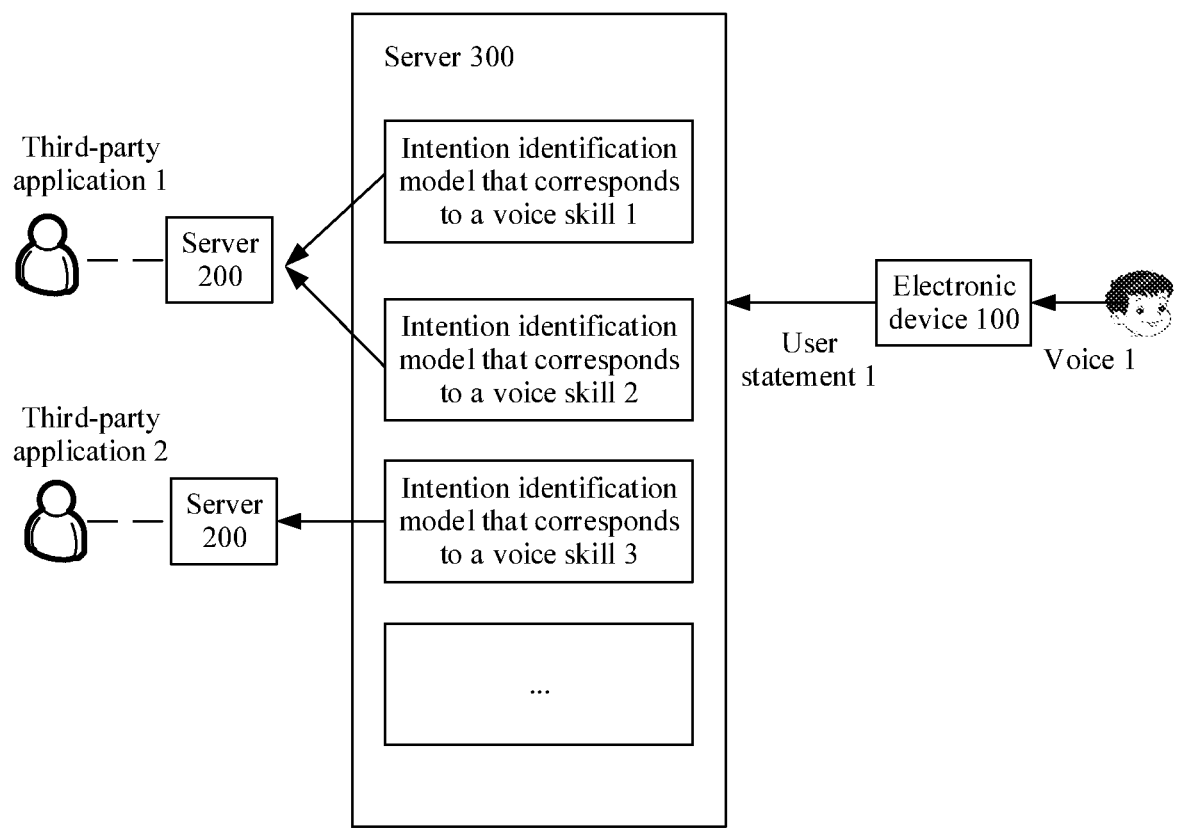
FIG. 3 is a schematic diagram of a usage scenario of an intention identification model according to an embodiment of this application.

For example, FIG. 3 is a schematic diagram of a process in which the server 300 determines the third-party application on which the service is provided for the user. It is assumed that in addition to the intention identification model (belonging to one of voice skills of a third-party application 1) that corresponds to the voice skill 1 and that is newly obtained through learning, the server 300 further stores an intention identification model that corresponds to a voice skill 2 of the third-party application 1, an intention identification model that corresponds to a voice skill 3 of a third-party application 2, and the like.

Specifically, the user enters a voice 1 by using the electronic device 100. The electronic device 100 may convert the voice 1 into a corresponding text, namely, a user statement 1, and send the text to the server 300. Alternatively, the electronic device 100 may directly send the voice 1 to the server 300, and the server 300 converts the voice 1 into a text (a user statement 1). The server 300 distributes the user statement 1 to an intention identification model that corresponds to each voice skill. The intention identification model that corresponds to each voice skill performs an operation. The server 300 determines that the user statement 1 corresponds to the voice skill 1, in other words, determines a service that corresponds to the voice skill 1 of the third-party application and that needs to be provided for the user.

In some embodiments, after determining the third-party application on which the service is provided for the user, the server 300 may return information about the determined third-party application to the electronic device 100. The information about the third-party application may include address information of the server of the third-party application, and the information about the third-party application may further include information about a specific service that needs to be provided for the user, for example, meal ordering or order query. Then, the electronic device 100 may establish a communication connection to the server 200 of the third-party application, and the server 200 of the third-party application provides a corresponding service for the user. In some other embodiments, the server 200 may establish a communication connection to a server 200 of a corresponding third-party application, and send service request information of the user to the server 200 of the third-party application. The server 200 of the third-party application may interact with the electronic device 100 by using the server 300, to provide a corresponding service for the user. The service request information may include information about a specific service requested by the user, for example, meal ordering or order query. A specific manner in which the server 200 of the third-party application provides the service for the user of the electronic device 100 is not limited in this embodiment of this application.

Figure 4:
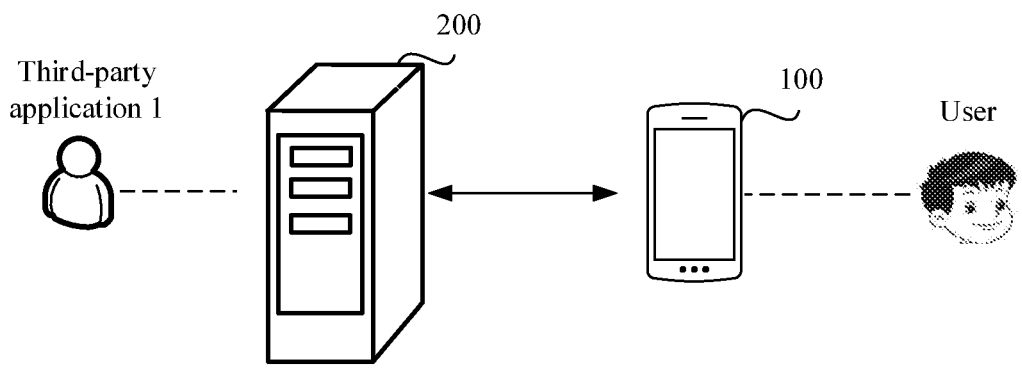
FIG. 4 is a schematic structural diagram 2 of a human-machine dialog system according to an embodiment of this application.

It should be noted that FIG. 4 is a schematic diagram of another human-machine dialog system according to an embodiment of this application. The human-machine dialog system includes one or more electronic devices 100 and one or more servers 200. For the electronic device 100 and the server 200, refer to related descriptions in FIG. 1.

A difference lies in that the foregoing process of obtaining, through learning based on the training data that corresponds to the new voice skill and that is entered by the voice skill developer, the intention identification model that corresponds to the new voice skill may be executed on the server 200, or may be executed on the electronic device 100 when an operation function of the electronic device 100 can support an operation of the process. An entity for training the intention identification model is not limited in the method provided in this embodiment of this application. If the server 200 of the third-party application trains the intention identification model, the server 200 of the third-party application trains intention identification models of a plurality of voice skills of the third-party application. An example in which the server 300 trains the intention identification model is used below for description.

It should be noted that, in a process of training the intention identification model by the server 300, when the voice skill developer cannot provide sufficient training data, or when the voice skill developer cannot ensure accuracy of the training data, accuracy of a target model trained by the server 300 cannot be ensured. This affects accuracy of identifying a user intention by the server 300, and affects user experience of the electronic device. In addition, because there are many scenarios and various types of voice skills, a base model preset by the server 300 inevitably has some unreasonable cases, for example, the base model is not applicable to some scenarios or types of voice skills. This also affects the accuracy of the target model trained by the server 300.

It should be noted that the server 300 may provide a common human-machine dialog platform for a plurality of third-party applications, and a developer or a maintainer of the human-machine dialog platform may preset some basic skill templates (including some preset training data, a base model used during learning, and the like) on the human-machine dialog platform, and the skill templates cover some common use scenarios. Then, the third-party application may modify the basic skill models to implement a personalized requirement of the third-party application, or the third-party application adds a self-defined skill based on service content of the third-party application.

Therefore, the technical solution provided in this embodiment of this application may be applied to the process of learning, by the server 300, the intention identification model that corresponds to the new voice skill, to improve, based on the prior art, the accuracy of the intention identification model obtained by the server 300 after learning.

Figure 5:
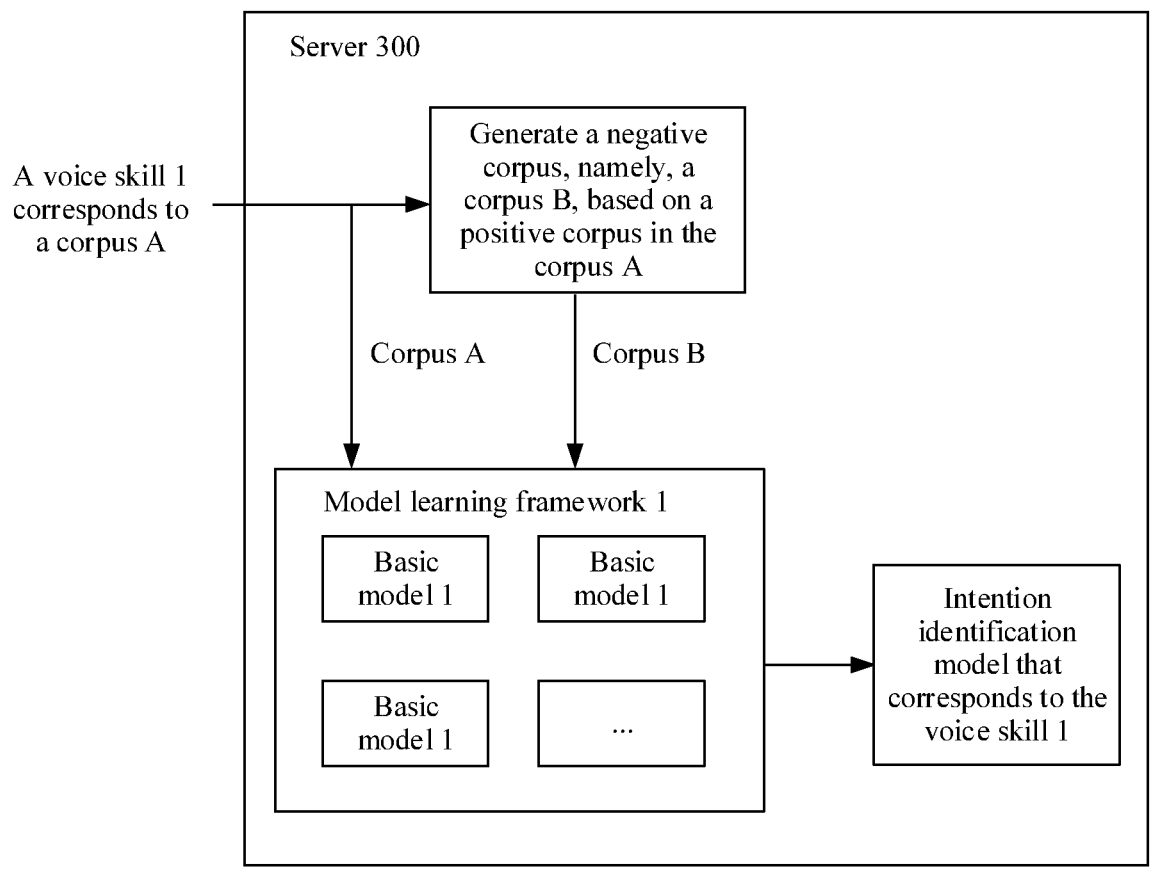
FIG. 5 is a schematic diagram 1 of an intention identification model learning method according to an embodiment of this application.

FIG. 5 is a schematic diagram of an intention identification model learning method according to an embodiment of this application. The server 300 may automatically generate some other pieces of training data based on entered training data that corresponds to a new voice skill. Then, the training data entered by the voice skill developer and other automatically generated training data are entered to the server 300 for learning by the server 300. Because more pieces of training data are introduced in a learning process, accuracy of the intention identification model obtained by the server 300 after learning can be improved.

For example, if entered training data of a voice skill 1 includes a corpus A, the server generates negative data, namely, a corpus B, based on positive data in the corpus A, and then enters the corpus A and the corpus B into a model learning framework for learning, to obtain an intention identification model that corresponds to the voice skill 1. The positive data is data that is of a user statement and that can trigger the server 300 to perform a corresponding operation. The negative data is similar to the positive data, but is not the positive data. In other words, the negative data is data of the user statement that the server 300 does not perform the corresponding operation.

In some other embodiments of this application, the server 300 may learn intention identification models that correspond to different voice skills of a same third-party application, and may further learn intention identification models that correspond to different voice skills of different third-party applications. In other words, the server 300 may store the intention identification models of different voice skills of the same third-party application, and the intention identification models that correspond to different voice skills of different third-party applications. Because the server 300 may store intention identification models that correspond to various types of voice skills or voice skills having various subjects, and there are large quantities of similar voice skills, corpuses that correspond to the voice skills may also be reused. Therefore, in the technical solution provided in this embodiment of this application, an intention identification model that corresponds to a voice skill may be trained based on training data of another voice skill similar to the voice skill. For example, the server 300 may expand a base model in the model learning framework based on the training data of the another voice skill similar to the voice skill. The another voice skill similar to the voice skill may belong to a same third-party application as the voice skill, or may belong to a third-party application different from the voice skill. Types and a quantity of similar voice skills are not limited in this embodiment of this application.

Figure 6:
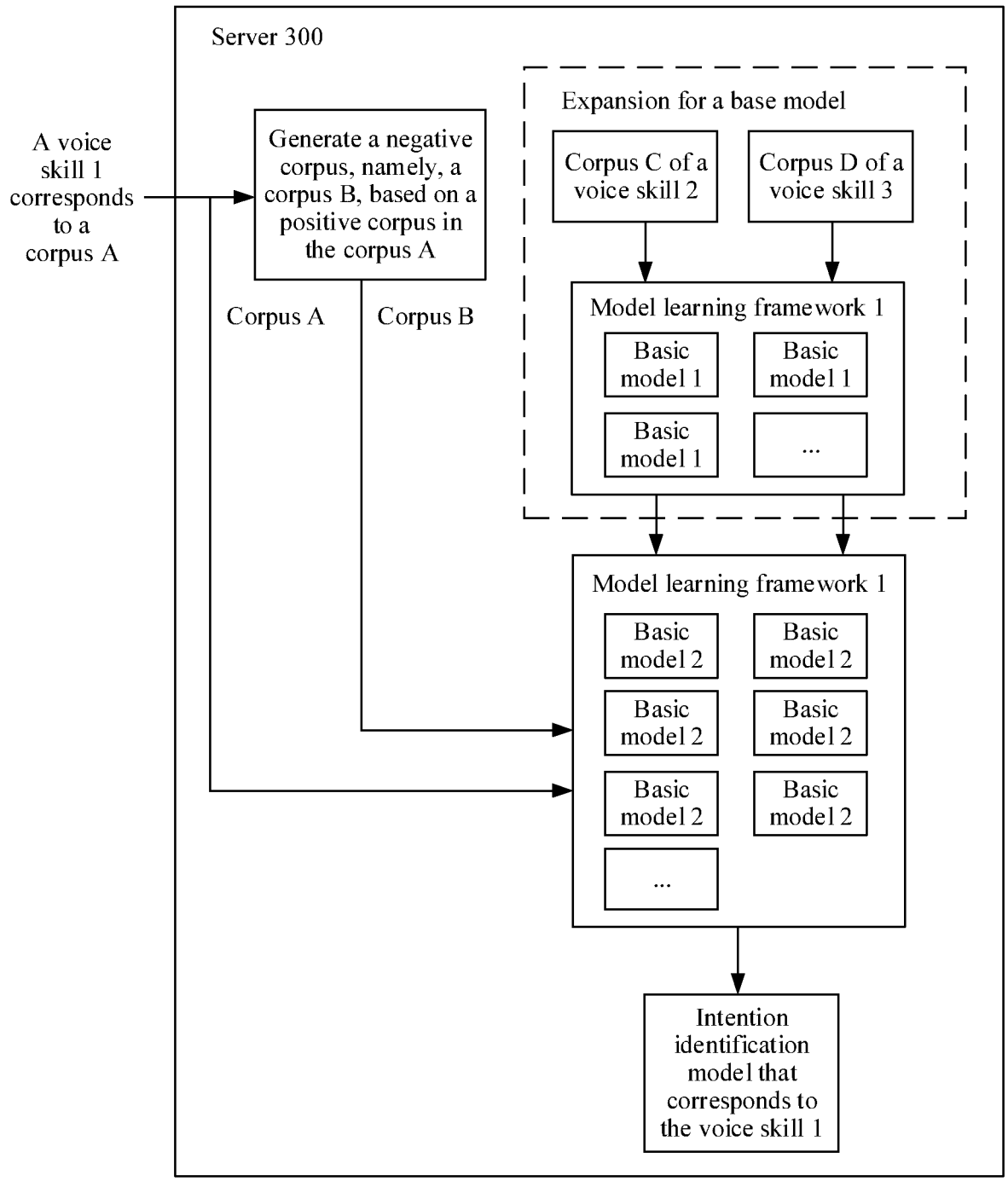
FIG. 6 is a schematic diagram 2 of an intention identification model learning method according to an embodiment of this application.

For example, FIG. 6 is a schematic diagram of another intention identification model learning process according to an embodiment of this application. An example in which the server 300 determines that a voice skill 2 and a voice skill 3 are other voice skills similar to a voice skill 1 is used for description.

The server 300 may enter a corpus C that corresponds to the voice skill 2 into a model learning framework 2 for learning, to obtain one or more basis models 2. The server 300 enters a corpus D that corresponds to the voice skill 3 into the model learning framework 2 for learning, to obtain one or more basis models 2. The model learning framework 2 includes one or more basis models 1 pre-stored on the server 300. The plurality of basis models 2 obtained based on the corpus C, the corpus D, and the model learning framework 2 are basis models obtained after the server 300 expands the base model, and may be used as basis models in a model learning framework 3. The model learning framework 2 may be, for example, a multi-task learning framework, and the model learning framework 3 may be, for example, an ensemble learning framework.

The server 300 may enter a corpus A that corresponds to the voice skill 1 and that is entered by a skill developer and an automatically generated corpus B into the model learning framework 3 for learning, to obtain an intention identification model that corresponds to the voice skill 1. Optionally, the server 300 may directly enter the corpus A that corresponds to the voice skill 1 and that is entered by the skill developer into the model learning framework 3 for learning, to obtain the intention identification model that corresponds to the voice skill 1. This is not limited in this embodiment of this application.

It can be learned that when the intention identification model is trained, the training data of the similar voice skill is further introduced, to learn more base models, enrich types of the base models, and improve accuracy of the intention identification model obtained through training.

Figure 7:
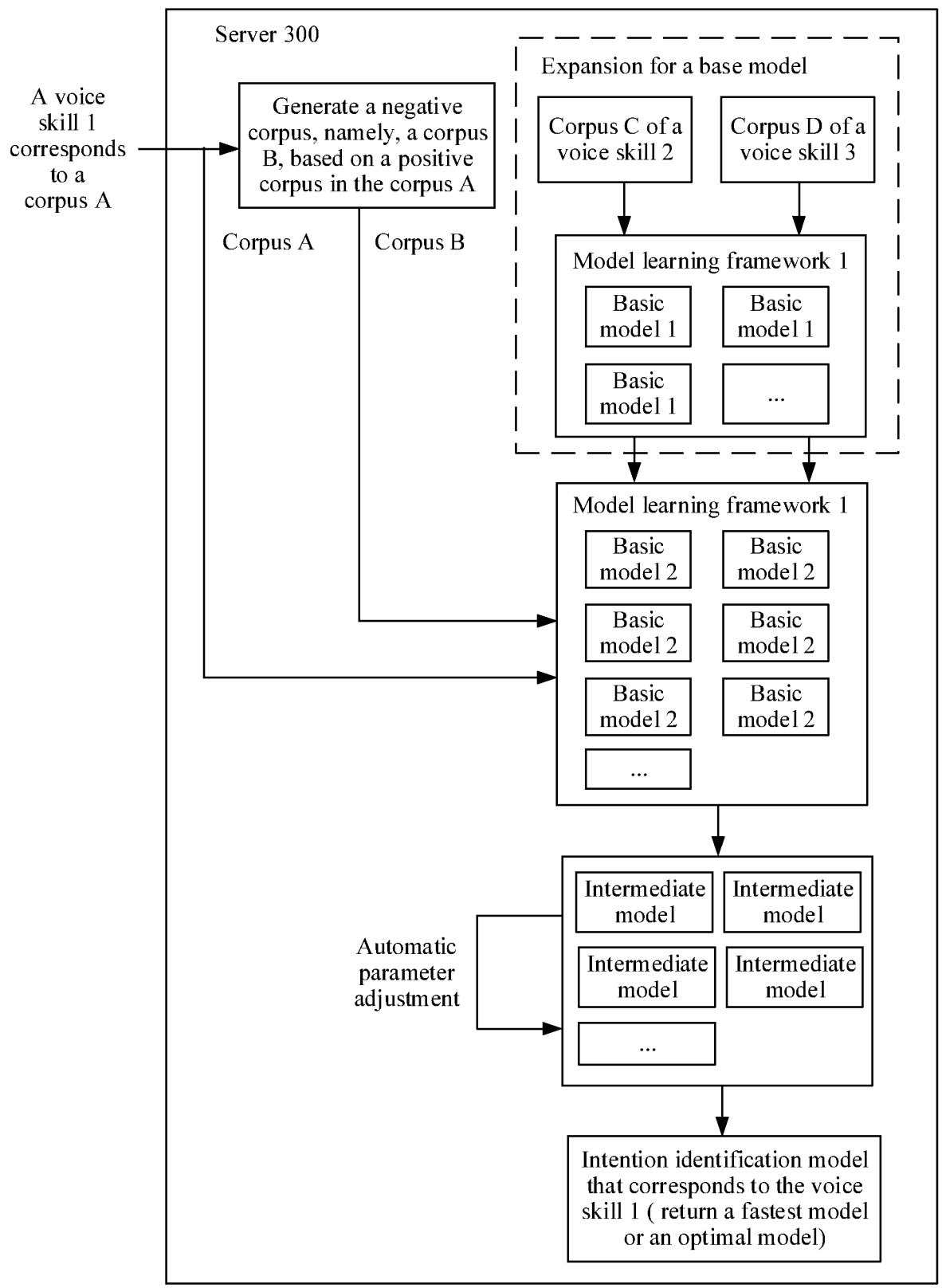
FIG. 7 is a schematic diagram 3 of an intention identification model learning method according to an embodiment of this application.

In still some embodiments of this application, FIG. 7 is a schematic diagram of still another process in which the server 300 learns an intention identification model according to an embodiment of this application. Specifically, in the process of learning the intention identification model, the server 300 successively obtains a plurality of intermediate models. The server 300 performs model selection and parameter adjustment on the intermediate models, to obtain a finally generated intention identification model with highest accuracy. It should be noted that all the intermediate models can implement a function of the intention identification model that corresponds to the voice skill 1. For different requirements of a voice skill developer, this embodiment of this application provides a plurality of return mechanisms, for example, returning a fastest generated intention identification model, and returning an optimal intention identification model. For example, when the fastest generated intention identification model is returned, because functions of the intention identification model can also be implemented by using the plurality of intermediate models obtained by the server 300 in the process of learning the intention identification model, a first obtained intermediate model may be determined as an intention identification model returned to a voice skill developer or a user, so that the voice skill developer or the user can obtain the intention identification model as soon as possible, to understand a function, performance, and the like of the intention identification model. For another example, when the optimal intention identification model is returned, in the process of learning the intention identification model, the server 300 may adjust parameters of the plurality of obtained intermediate models, to determine a model with relatively high accuracy as the intention identification model.

In addition, according to the technical solution provided in this embodiment of this application, when an intention identification model that corresponds to a voice skill is trained, with reference to training data of another voice skill similar to the voice skill, this embodiment of this application further provides a standard for determining an optimal model, to be specific, accuracy of the model is tested by using a corpus in the voice skill, for example, training data entered by the skill developer, accuracy of the model is also tested by using some corpuses that are out of the voice skill and that are determined by the server, for example, automatically generated negative data. Because more test data is introduced when the accuracy of the model is tested, a test result is more accurate. After the parameters in the model are adjusted based on the more accurate test result, the optimal intention identification model can be obtained. In other words, the technical solutions provided in this embodiment of this application help improve accuracy of the intention identification model. A specific implementation process is described in detail in the following.

Figure 8:
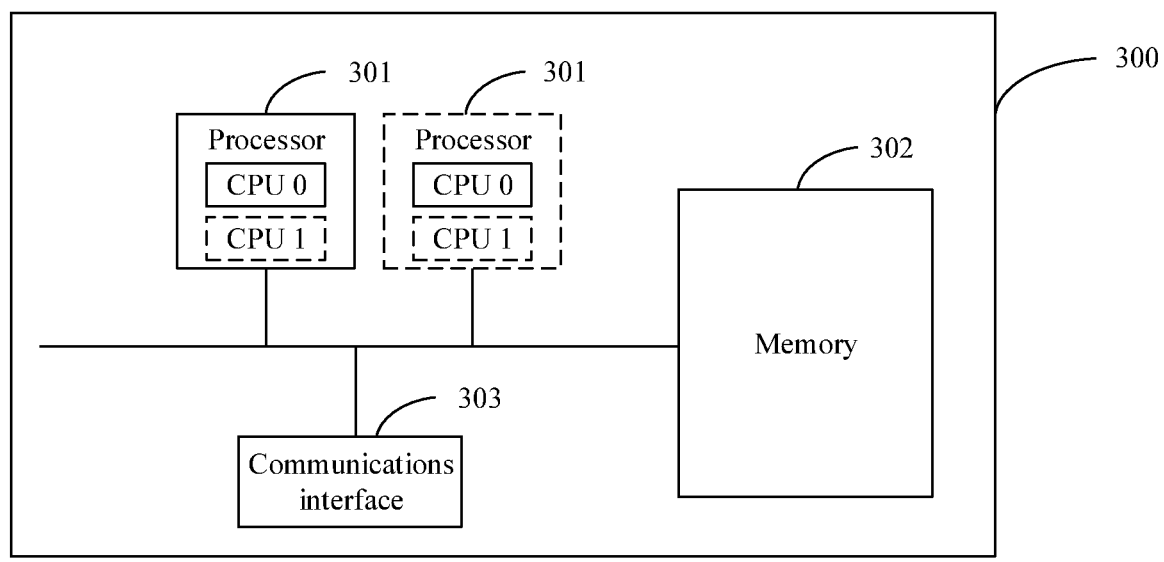
FIG. 8 is a schematic structural diagram of a server according to an embodiment of this application.

FIG. 8 is a schematic diagram of a hardware structure of a server 300 according to an embodiment of this application. The server 300 includes at least one processor 301, at least one memory 302, and at least one communications interface 303. Optionally, the server 300 may further include an output device and an input device that are not shown in FIG. 8.

The processor 301, the memory 302, and the communications interface 303 are connected by using a bus. The processor 301 may be a general-purpose central processing unit (Central Processing Unit, CPU), a microprocessor, an application-specific integrated circuit (Application-Specific Integrated Circuit, ASIC)), or one or more integrated circuits configured to control program execution in the solutions of this application. The processor 301 may alternatively include a plurality of CPUs, and the processor 301 may be a single-core (single-CPU) processor or a multi-core (multi-CPU) processor. The processor herein may refer to one or more devices, circuits, and/or processing cores configured to process data (for example, a computer program instruction).

In this embodiment of this application, the processor 301 may be specifically configured to automatically generate negative data of a new voice skill based on training data that is of the new voice skill and that is entered by a voice skill developer. The processor 301 may be further specifically configured to: determine another voice skill similar to the new voice skill, obtain data of the another voice skill, and expand a base model in a model learning framework. The processor 301 may further perform learning based on a base model after expansion, the training data entered by the developer, and the negative data automatically generated by the processor 301, to obtain an intention identification model. The processor 301 may be further specifically configured to adjust parameters of a plurality of intermediate models generated in a learning process, to generate an optimal intention identification model and the like.

The memory 302 may be a read-only memory (Read-Only Memory, ROM), another type of static storage device that can store static information and an instruction, a random access memory (Random Access Memory, RAM), or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another optical disc storage, an optical disc storage (including a compressed optical disc, a laser disc, an optical disc, a digital versatile optical disc, a Blu-ray disc, and the like), a magnetic disk storage medium or another magnetic storage device, or any other medium that can carry or store expected program code in a form of an instruction or a data structure and that can be accessed by a computer, but is not limited to this. The memory 302 may exist independently, and is connected to the processor 301 by using the bus. The memory 302 may alternatively be integrated with the processor 301. The memory 302 is configured to store application program code for performing the solutions in this application, and the processor 301 controls the performing. The processor 301 is configured to execute the computer program code stored in the memory 302, to implement the data transmission method in this embodiment of this application.

In this embodiment of this application, the memory 302 may be configured to store data that is of a basic model preset in the learning framework on the server 300, and may be further configured to store: negative data that corresponds to each voice skill and that is automatically generated by the server 300, each intermediate model generated by the processor 301 in the learning process, various data used for training or testing, an intention identification model that corresponds to each learned voice skill and that is obtained through learning, and the like.

The communications interface 303 may be configured to communicate with another device or communications network, such as an Ethernet or a wireless local area network (wireless local area networks, WLAN).

In this embodiment of this application, the communications interface 303 may be specifically configured to communicate with an electronic device 100, to implement interaction with a user of the electronic device. The communications interface 303 may be further specifically configured to communicate with a server 200 of a third-party application. For example, the server 300 may receive training data that corresponds to a new voice skill and that is entered by the server 200 of the third-party application, or the server 300 may send a determined user service request to the server 200 of the third-party application, so that the server 200 of the third-party application provides a corresponding service and the like for the user of the electronic device.

When communicating with the processor, the output device may display information in a plurality of manners. For example, the output device may be a liquid crystal display (Liquid Crystal Display, LCD), a light emitting diode (Light Emitting Diode, LED) display device, a cathode ray tube (Cathode Ray Tube, CRT) display device, a projector (projector), or the like. When communicating with the processor, the input device may receive input of the user in a plurality of manners. For example, the input device may be a mouse, a keyboard, a touchscreen device, or a sensing device.

All technical solutions in the following embodiments may be implemented on the server 300 having the foregoing hardware architecture.

Figure 9:
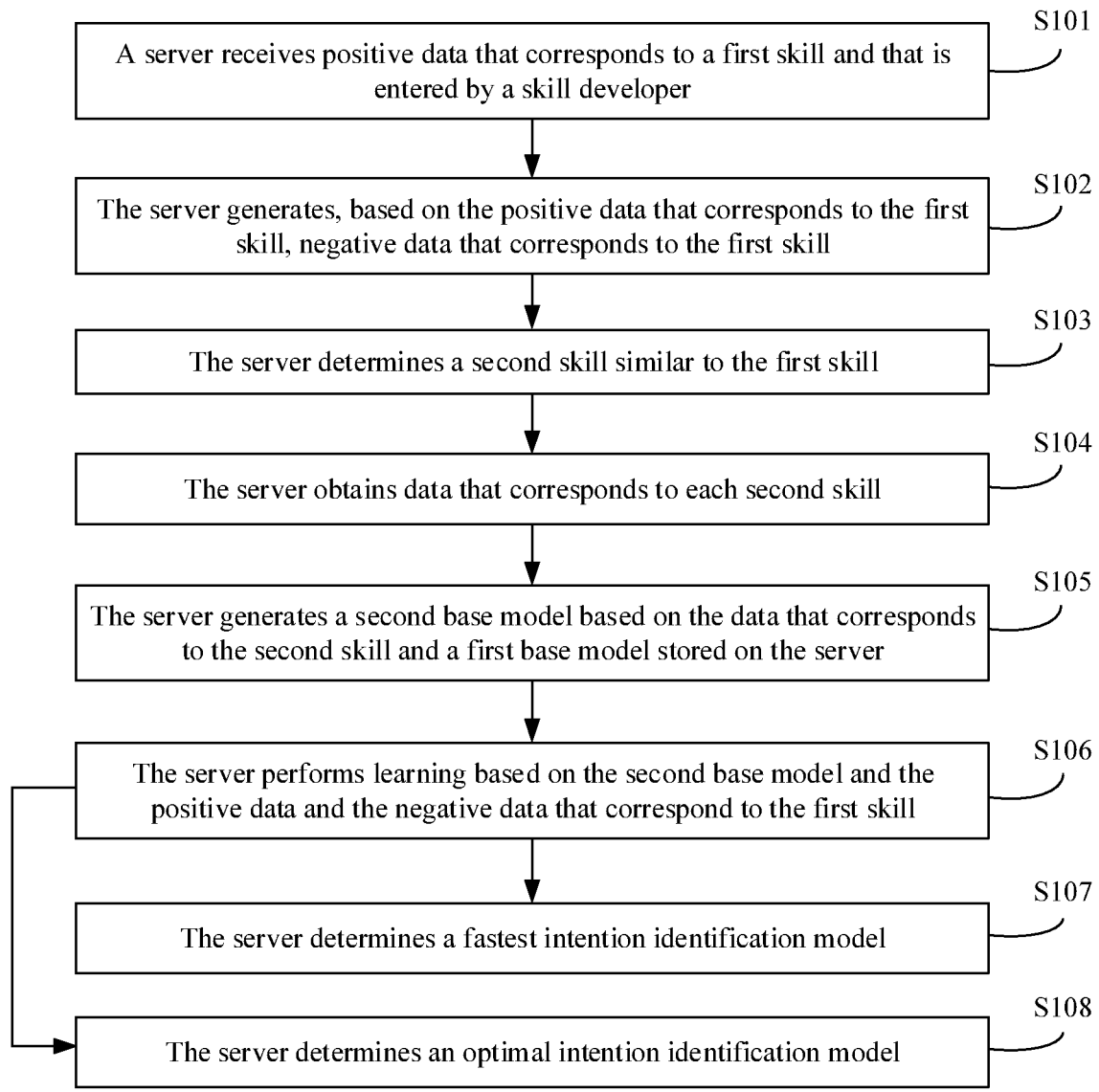
FIG. 9 is a schematic flowchart of an intention identification model learning method according to an embodiment of this application.

FIG. 9 is a schematic flowchart of an intention identification model learning method according to an embodiment of this application. The method specifically includes the following steps.

S101: A server receives positive data that corresponds to a first skill and that is entered by a skill developer.

The skill developer may be a developer of a third-party application, or may be a manufacturer of an electronic device. This is not limited in this embodiment of this application.

In some embodiments of this application, the server provides a skill development platform for the skill developer. The skill developer may log in to the platform of the skill developer through a telecommunications network (a communications network such as 3G/4G/5G), a WI-FI network, or the like, and register an account, and start to create a new voice skill, namely, the first skill. The skill developer may enter basic information such as a name of the first skill and a classification of the first skill, and then enter an intention included in the first skill and positive data that corresponds to each intention. The positive data that corresponds to each intention includes: a corresponding operation that needs to be performed by the server in response to receiving of the positive data, for example, triggering a corresponding service, or returning a corresponding dialog to the electronic device. In other words, data that is of a user statement and that can trigger the server to perform a corresponding operation is referred to as positive data, or may be referred to as a positive corpus, a positive example, positive example data, data in a skill, or the like.

In some other embodiments of this application, the skill developer may further enter some pieces of negative data that correspond to each intention of the first skill when entering the positive data that corresponds to each intention of the first skill. The negative data is similar to the positive data, but does not belong to this type of positive data. The negative data may also be referred to as a negative corpus, a negative example, negative example data, data that is not in the skill, or the like. This is not limited in this embodiment of this application.

For example, the skill developer is a developer of a Meituan application, and a first skill developed by the developer of the Meituan application is a meal ordering service. The developer of the Meituan application may enter positive data that corresponds to the meal ordering service, for example, takeaway ordering, meal ordering. The developer of the Meituan application may also enter the negative data, such as air ticket booking.

S102: The server generates, based on the positive data that corresponds to the first skill, negative data that corresponds to the first skill.

The first skill includes a plurality of intentions, and each intention may correspond to one or more pieces of positive data. For each intention, the server may generate corresponding negative data based on the positive data of each intention. This helps improve accuracy of the subsequently trained intention identification model.

This is because in the prior art, when there is only one type of training data (positive data) entered into the server, when the intention identification model trained by the server determines a user statement, a determining standard is only a threshold set by the skill developer, in other words, when confidence of the statement is lower than the threshold, the statement is not considered as the intention that is in the first skill. When the confidence of the statement reaches the threshold, the statement is considered as the intention that is in the first skill. In actual scenarios, thresholds of different voice skills depend on factors such as a similarity between the different voice skills. Therefore, it is difficult to set the thresholds. In this embodiment of this application, other types of training data, for example, introduced negative data, may be further introduced to determine a type. This helps avoid misidentification, and helps improve accuracy of the intention identification model obtained through training.

For example, this embodiment of this application provides two methods for generating, based on the positive data that corresponds to the first skill, the negative data that corresponds to the first skill. The two methods are as follows.

Method 1: For each intention that is in the first skill, the server extracts a keyword of each intention from the positive data that corresponds to each intention, and combines the extracted keyword with another unrelated word to form the negative data that corresponds to each intention.

It should be noted that the foregoing keyword is a significant feature that is most likely to affect a feature weight of classification (intention identification). In the prior art, a reason for misidentification is that a significant feature of another type (another intention) highly overlaps a significant feature of this type (this intention). For example, an intention 1 indicates to start an app, and an intention 2 indicates to close an app. The "app" in the intention 1 and the intention 2 is a significant feature of a high frequency, but are not a significant feature of each type. However, if the significant feature of a high frequency is still used during classification, misidentification is easily caused. Therefore, in this embodiment of this application, a weight of a significant feature included in each type (intention) is reduced during classification, to improve accuracy.

The keyword extracted from the foregoing positive data may be manually annotated by the skill developer, or may be extracted by using a related mining technology of sampling keywords. For example, the keyword in the positive data is also a feature in the positive data. Therefore, the keyword may be extracted by using a feature selection method, for example, an LR (logistic regression) method based on L1 regularization (regularization). In this embodiment of this application, the keyword may be further extracted by using a wrapper (wrapper) feature selection method, for example, LVW (Las Vegas Wrapper), a sparse representation method based on dictionary learning, and a simple heuristic algorithm (Heuristic Algorithm). A specific method for extracting the keyword is not limited in this embodiment of this application.

For example, the LR method based on L1 regularization is used as an example to briefly describe a process of extracting the keyword of the positive data. If the intentions that correspond to the positive data have K categories in total (in other words, the positive data entered by the user corresponds to K intentions, in other words, one intention may be understood as one type), and K classifiers of "1 vs the rest" are constructed respectively, and a feature that has a small impact on a classification weight may be ignored by using a L1 norm, to retain a feature that has an impact on the classification. Because each piece of positive data is converted into two classifications, and the feature is a 0/1 discrete feature, a significant feature, that is, a keyword that has a greatest impact on a classification weight of each intention, can be obtained through filtering and sorting based on a weight symbol and an absolute value.

The unrelated word after the extracted keyword is combined may be a word (or a word combination or a sentence, or the like) whose form is similar to that of an original positive data but whose semantics deviates from that of the original positive data, a word (or a word combination or a sentence, or the like) whose semantics is unrelated to that of an original positive data, or the like. For example, a sentence similarity method may be used to determine whether a combined word (or a word combination, a sentence, or the like) deviates from or is unrelated to semantics of the original positive data.

For example, the server may randomly combine keywords that correspond to different intentions, to generate the negative data. The server may further randomly combine a keyword in each intention with words that are unrelated to the first skill, for example entity words, to generate the negative data. A method for selecting an unrelated word by the server and a manner of combining the keyword of each intention with another unrelated word are not limited in this embodiment of this application.

For example, positive data of a skill contains "open menu" and "close menu", which respectively correspond to an intention 1 and an intention 2. After keywords of the positive data are extracted, a keyword "open" of the intention 1 and a keyword "close" of the intention 2 may be obtained. In this case, "open close" obtained by combining the keywords of different intentions. "open drawer", "close WeChat" and the like obtained by combining the keyword of each intention with the another unrelated word constitute negative data of the skill.

Method 2: In this embodiment of this application, the server stores a large amount of training data of a voice skill, including data of different voice skills of a same third-party application and data of different voice skills of different third-party applications. The large amount of training data may belong to different fields and be classified into different types, and constitute all sets of training data on the server. For the first skill, the server may determine, based on the classification of the first skill, a first set from the sets of training data stored on the server. Corpuses in the first set may be a set of corpuses that may conflict with the positive data of the first skill. When determining the first set, the server may determine, based on a one-class classification or based on a similarity retrieval, for example, inverted index or sentence similarity calculation, the corpuses that conflict with the positive data or suspicious corpuses.

It should be noted that when determining the first set, the server may directly determine the first set from the sets of training data, or may gradually determine the first set from the sets of training data. In other words, the server may first determine a set A from the sets of training data, and the set A is less than the sets of training data. Then, a set B is determined from the set A, the set B is less than the set A, and so on, until the first set is determined. A specific method for determining the first set by the server is not limited in this embodiment of this application.

The corpuses in the first set may be corpuses similar to the positive data, for example, include a keyword that is the same as or similar to the positive data, or include an entity word (for example, a noun) that is the same as or similar to the positive data. For example, the positive data is "open menu", and if a keyword of the corpuses is "open", the first set may include, for example, "turn on radio", "open menu", and "hide menu".

The server may sample a specific quantity of corpuses from the first set, and further determine whether the sampled corpuses are the negative data that corresponds to the first skill.

The specific quantity (namely, the quantity of the sampled corpuses) may be determined based on a quantity of the positive data. For example, the quantity of the sampled corpuses may be determined as equal to the quantity of pieces of the positive data, or may be a maximum quantity of corpuses or an average quantity of corpuses of positive data that corresponds to each intention, or may be a preset quantity. The quantity of the sampled corpuses is not specifically limited in this embodiment of this application.

In a sampling process, a manner such as random sampling or sampling based on topic distribution may be used. A specific sampling manner is not limited in this embodiment of this application.

That the server determines whether the sampled corpuses are the negative data of the first skill may also be understood as that the server classifies the sampled corpuses. If semantics of the sampled corpuses is the same as semantics of the positive data, the sampled corpuses are the positive data; or if semantics of the sampled corpuses is different from semantics of the positive data, the sampled corpuses are the negative data. Whether the sampled corpuses are the negative data of the first skill may be determined through manual definition, or may be determined through manual iteration and according to a clustering algorithm. The clustering algorithm may be a hierarchical clustering (hierarchical clustering) method, a text clustering/classification method based on a topic model (Topic Model), or the like. A manner of the clustering algorithm and the manual iteration may be, for example, performing manual annotation on some features that cannot be identified according to the clustering algorithm, for example, a colorfulness degree of a color; and manually determining whether some suspicious corpuses that cannot be identified according to the clustering algorithm are the negative data. The clustering algorithm may also learn a rule of the manual annotation. Whether another sampled corpus is the negative data, or the like is determined according to the rule.

It should be noted that, when generating the negative data based on the positive data, the server may use either of the foregoing methods, or use both of the foregoing methods, or use another method. A method for generating the negative data based on the positive data is not limited in this embodiment of this application.

S103: The server determines a second skill similar to the first skill, where there is at least one second skill.

It should be noted that because a large amount of data of different voice skills is stored on the server, and there is a large amount of similar data between the different voice skills, the server may share the data of the different voice skills. Specifically, after obtaining consent of each voice skill developer, the server may share data of each voice skill. A sharing manner may be, for example, sharing based on a category. For example, data may be shared between different voice skills in a same category, but data cannot be shared between different voice skills in different categories. In some embodiments, the server may add a sharing layer between voice skills that can share data, and the different voice skills may obtain data of another voice skills through the sharing layer. In some other embodiments, some pieces of data may be further built on the server, and the data may be used by different voice skills. In this way, when the server learns an intention identification model that corresponds to a new voice skill, if a voice skill developer does not enter training data that corresponds to the voice skill, or when a voice skill developer enters a small amount of training data, the server may perform learning by sharing data of another voice skill and the data built on the server, to obtain the intention identification model.

Therefore, in steps S103 and S104, the server may determine, based on, for example, the type of the first skill or similarity between training data of the first skill and training data of another skill, another second skill that is similar to the first skill and that is on the server, where the second skill may be another voice skill developed by a developer of the first skill, or may be another voice skill developed by another voice skill developer, and neither an extraction method for the second skill nor an extraction quantity is limited in this embodiment of this application.

S104: The server obtains data that corresponds to each second skill.

For example, the server may obtain, through the sharing layer, the training data that corresponds to each second skill, where the training data may include positive data and negative data, and may specifically include positive data and negative data that are entered by a developer of the second skill, or may include negative data or the like that is automatically generated by the server in a process of learning an intention identification model or another model that corresponds to the second skill.

S105: The server generates a second basic model based on the data that corresponds to the second skill and a first basic model stored on the server.

The server learns an intention identification model that corresponds to each skill, by using a preset model learning framework including one or more used first basis models, an organization relationship (which may include a weight and a hierarchical relationship between the first basis models) between the first basis models, and the like.

In this embodiment of this application, the server enters a corpus that corresponds to each second skill into the first base model for learning, to generate a plurality of second base models. In some embodiments, for example, a multi-task learning method may be used. The multi-task learning method may be implemented based on a model such as a deep learning convolutional neural network (Convolutional Neural Networks, CNN) or a bidirectional long short-term memory (Long Short-Term Memory, LSTM). In some other embodiments, adversarial training may be further added to a multi-task learning process, to further implement refinement of the shared data, improve accuracy of the second base model, and further improve accuracy of the intention identification model.

For example, as shown in FIG. 6, an example in which the first skill is the voice skill 1 and the entered training data of the first skill is the corpus A is used for description. It is assumed that the server determines that voice skills similar to the voice skill 1 include the voice skill 2 and the voice skill 3. The training data that corresponds to the voice skill 2 is the corpus C, and the training data that corresponds to the voice skill 3 is the corpus D.

The server enters the corpus C into the model learning framework 2 for learning. The model learning framework 2 includes one or more first basis models, namely, the basis model 1. The model learning framework 2 may be, for example, a multi-task learning framework. Specifically, the server enters the corpus C into the multi-task learning framework to generate a plurality of second basis models, namely, a plurality of basis models 2. In this case, the server performs a task learning of the voice skill 2. The server enters the corpus D into the multi-task learning framework to generate a plurality of second base models. In this case, the server performs a task learning of the voice skill 3.

In other words, when learning the intention identification model that corresponds to the voice skill 1, the server further introduces training data of another voice skill (the voice skill 2 or the voice skill 3), and performs multi-task joint training on the training data of the another voice skill, to generate second base models of different representation space. Then, the server enters the second base models of the different representation space into the ensemble learning framework for learning, to obtain the intention identification model. Compared with a method in the prior art in which only feature transformation is performed on the training data or the first base model is replaced, the technical solution provided in this embodiment of this application is more conducive to improving accuracy of the learned intention identification model that corresponds to the voice skill.

S106: The server performs learning based on the second base model and the positive data and the negative data that correspond to the first skill. If the server determines a fastest returned intention identification model according to a policy, a step S107 is performed; or if the server determines an optimal returned intention identification model according to a policy, a step S108 is performed.

The foregoing policy may be a policy preset by the server, to be specific, which model is returned or two models are returned. Alternatively, the foregoing policy may be a policy recommended by the server to the user, to be specific, different models may be recommended, based on different situations, to be returned to the user. Alternatively, the foregoing policy may be a return policy that is entered by the user and that is received by the server, and the server determines to return to a corresponding model. The policy is not limited in this embodiment of this application.

In some embodiments of this application, the server may perform learning by using an ensemble learning method, for example, a stacking ensemble learning method. In a learning process, the server may successively generate some intermediate models.

Figure 10:
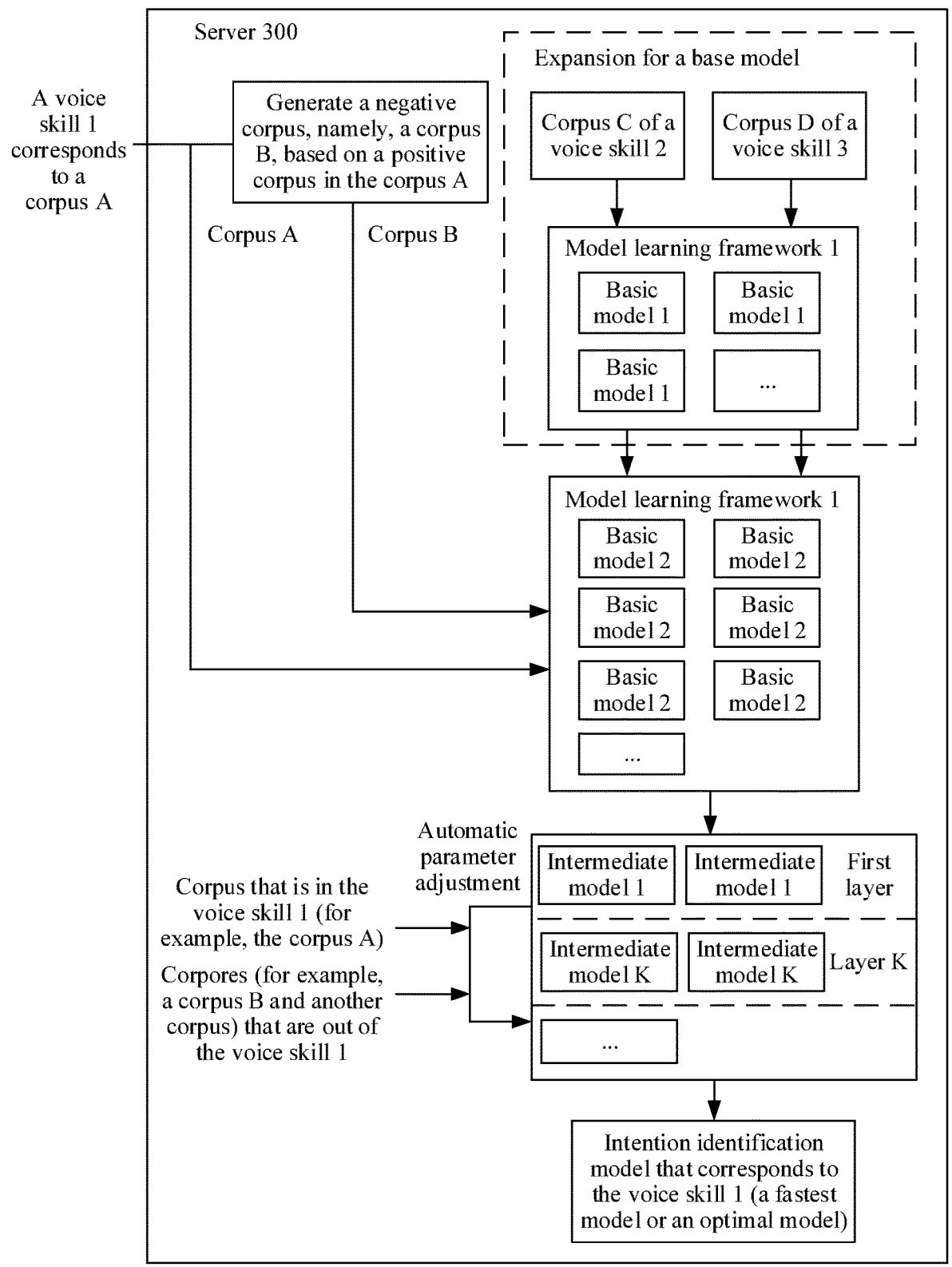
FIG. 10 is a schematic diagram 4 of an intention identification model learning method according to an embodiment of this application.

For example, FIG. 10 is a schematic diagram of still another intention identification model learning process according to an embodiment of this application. When the model learning framework 3 is a stacking ensemble learning framework, a server enters positive data and negative data that correspond to a first skill into the stacking ensemble learning framework, and learns an intermediate model at a first layer, where the intermediate model is denoted as an intermediate model 1. Then, the server enters a feature obtained by the intermediate model at the first layer into the stacking ensemble learning framework, learns an intermediate model at a second layer, and so on, until an intention identification model is finally generated.

S107: The server determines a fastest intention identification model.

In a learning process in the step S106, the server successively generates a plurality of intermediate models, and the intermediate models can independently implement a function of an intention identification model that corresponds to a first skill. Therefore, based on a requirement of a skill developer, the server can first return some intermediate models as fastest generated models. In some embodiments, the server may determine and return a first generated intermediate model as the fastest intention identification model. As shown in FIG. 10, the server may determine that a first generated first intermediate model is the fastest intention identification model. In some other embodiments, the server may determine and return a model generated by using a specified method, and determine the model as the fastest intention identification model. In this way, the skill developer can quickly obtain the intention identification model to understand a function and performance of the intention identification model.

S108: The server determines an optimal intention identification model.

It is generally considered that after the server completes learning based on a second base model and the positive data and the negative data that correspond to the first skill, a finally obtained intention identification model is the optimal intention identification model. This is because in a learning process, the server performs model selection and parameter adjustment based on the plurality of intermediate models that are successively generated, so that the finally obtained intention identification model has highest accuracy. For example, parameter optimization may be performed by using a grid search (grid search) method, a Bayesian optimization (Bayesian optimization) method, or the like.

It should be noted that parameter optimization in the prior art is performed based on training data that corresponds to the first skill and that is entered by a developer of the first skill. Therefore, the finally obtained accuracy of the intention identification model reflects only accuracy when data that is in the first skill is used for prediction.

However, in this embodiment of this application, in addition to the data that is in the first skill (for example, the positive data that is of the first skill and that is entered by the developer of the first skill) when the server trains the intention identification model, data that is out of the first skill is also used (for example, the negative data that is out of the first skill that is automatically generated, and the data of the second skill that is similar to the first skill is also used when a base model is expanded).

Therefore, as shown in FIG. 10, when selecting the optimal intention identification model, the server needs to consider the data that is in the first skill (for example, the positive data of the first skill) and the data that is out of the first skill (for example, the negative data that is of the first skill and that is automatically generated by the server). The server needs to consider the following two parts for the accuracy: One part is the accuracy when the data that is in the first skill is used for prediction, in other words, the accuracy of the data that is in the first skill. When the data that is in the first skill is used for prediction, the prediction is correct if the data that is in the first skill is predicted as a positive type (in other words, the data that is in the first skill can be identified as an intention that the first skill can be invoked). The other part is the accuracy when the data that is out of the first skill is used for prediction, in other words, the accuracy of the data that is out of the first skill. When the data that is out of the first skill is used for prediction, the prediction is correct if the data that is out of the first skill is predicted as a negative type (in other words, the data that is out of the first skill can be identified as an intention that the first skill cannot be invoked).

In some embodiments, a false recall rate of the data that is out of the first skill may also be used to reflect the accuracy when the data that is out of the first skill is used for prediction. A lower false recall rate of the data that is out of the first skill indicates higher accuracy when the data that is out of the first skill is used for prediction. It can be learned that the accuracy of data that is in the first skill is inversely proportional to the accuracy of the data that is out of the first skill, and is directly proportional to the false recall rate of the data that is out of the first skill. In other words, higher accuracy of the data that is in first skill indicates higher false recall rate of the first skill. In this case, the intention identification model finally obtained through training cannot be optimal in the two parts. Therefore, this embodiment of this application provides a method for evaluating the optimal intention identification model.

The server may set confidence of the first skill. The confidence may be set by the user (for example, the developer of the first skill). A confidence parameter may reflect a relative requirement of the user on two indicators: the accuracy of the data that is in the first skill and the false recall rate of the data that is out of the first skill. For example, a higher confidence indicates that the user expects a lower false recall rate of the data that is out of the first skill, in other words, higher accuracy when the data that is out of the first skill is used for prediction. Therefore, the following formula 1 may be used to evaluate the optimal intention identification model:

$$\text{Score} = \text{accuracyIn} \times (1-C) + \text{accuracyOut} \times C \quad \text{(formula 1)}$$

The score is a score for evaluating the optimal intention identification model. A higher score indicates higher accuracy of the intention identification model and better meets the requirement of the user. The accuracyIn is average accuracy of the data that is in the first skill. The accuracyOut is average accuracy of the data that is out of the first skill. C is a confidence value set by the user, and C is greater than or equal to 0 and less than or equal to 1.

When the server calculates the average accuracy of the data that is in the first skill and the average accuracy of the data that is out of the first skill, for example, a K-fold cross validation method may be used. For a specific method for K-fold cross verification, refer to the prior art. Details are not described herein.

In some other embodiments of this application, to avoid a relatively large impact on the accuracy of obtaining the intention identification model through training when the confidence is set improperly by the user, for example, the accuracy of the data that is in the skill is ignored when the confidence is set to a large value by the user, the server may further set a parameter to control the confidence set by the user. In this case, the following formula 2 may be used to evaluate the optimal intention identification model:

$$\text{Score} = \text{accuracyIn} \times (1 - C \times P) + \text{accuracyOut} \times C \times P \quad \text{(formula 2)}$$

Meanings of the score, the accuracyIn, the accuracyOut, and the parameter C are the same as those in the formula 1. Details are not described again. P is a parameter set on the server. P is greater than or equal to 0 and less than or equal to 1. The P value can be used to control an impact of the confidence set by the user on the score. A larger P value indicates a greater impact of the confidence that the user is allowed to set on the score. A smaller P value indicates a smaller impact of the confidence that the user is allowed to set on the score.

It should be noted that, in a process of performing the steps S107 and S108, the server may share some common features of an intermediate model by using a sharing layer, to reduce a calculation amount and improve model training efficiency.

Then, after a fastest intention identification model or the optimal intention identification model is learned, the model may be used to predict a new user statement entered by a user of an electronic device, to determine the user intention, to provide a corresponding service for the user.

For example, in the human-machine dialog system shown in FIG. 1, the fastest intention identification model or the optimal intention identification model learned may be deployed on the server 300, or may be deployed on the server 200. When the model is deployed on the server 300, the server 300 may store intention identification models that correspond to different voice skills of a plurality of third-party applications (for example, a third-party application 1 and a third-party application 2). When the model is deployed on the server 200, the server 200 may store intention identification models that correspond to different voice skills of the third-party applications.

For another example, in the human-machine dialog system shown in FIG. 4, a fastest optimal intention identification model or the optimal intention identification model learned may be deployed on the server 200, and the server 200 may store intention identification models that correspond to different voice skills of the third-party application 1.

For application of the intention identification model, refer to the foregoing description. Details are not described again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An intention identification model learning method, comprising:
    receiving positive data that corresponds to each of a plurality of intentions in a first skill and that is from a skill developer;
    generating, based on the positive data, negative data corresponding to each of the intentions;
    obtaining training data corresponding to a plurality of second skills that is similar to the first skill according to similarity criteria;
    performing learning, based on the training data and a first basic model, to generate at least one second basic model, wherein the first basic model is preset;
    extracting, for each of the intentions, a keyword corresponding to each of the intentions, wherein the keyword is a key feature that affects a weight of the first basic model;

performing one of combining keywords corresponding to different intentions in the first skill, or combining the keywords with words that are unrelated to the first skill and obtaining combined words for generating at least part of the negative data that corresponds to the different intentions; and performing learning to generate an intention identification model based on the positive data, the negative data, and the at least one second basic model to train the intention identification model for the first skill, wherein the intention identification model for the first skill is trained using first data that is in the first skill including the positive data, and second data that is out of the first skill including the negative data that corresponds to each intention in the first skill and the training data for the second skills.

2. The intention identification model learning method of claim 1, further comprising:

obtaining a first set from all sets of the training data based on a classification of the first skill, wherein the training data comprises the positive data and the negative data;

sampling a preset quantity of pieces of the training data; and obtaining the negative data through a manual annotation or according to a clustering algorithm in response to sampling and based on the training data.

3. The intention identification model learning method of claim 1, further comprising:

obtaining the second skills based on a classification of the first skill or the positive data; and obtaining the training data through a sharing layer.

4. The intention identification model learning method of claim 1, further comprising performing learning, using a multi-task learning method based on the training data and the first basic model, to generate the at least one second basic model.

5. The intention identification model learning method of claim 1, further comprising performing learning, using an ensemble learning method based on the positive data, the negative data, and the at least one second basic model, to generate the intention identification model.

6. The intention identification model learning method of claim 5, further comprising:

generating a plurality of intermediate models in a process of generating the intention identification model; and determining that a first generated intermediate model of the plurality of intermediate models is a fastest intention identification model or obtaining an optimal intention identification model after performing model selection and parameter adjustment on the plurality of intermediate models.

7. The intention identification model learning method of claim 6, further comprising:

calculating a first accuracy of each of the intermediate models based on the positive data;

calculating a second accuracy of each of the intermediate models based on the negative data; and determining the optimal intention identification model after performing the model selection and the parameter adjustment on the intermediate models based on a first accuracy rate, a second accuracy rate, and a weight from the skill developer.

8. An apparatus, comprising:

a processor; and a memory coupled to the processor and configured to store instructions that, when executed by the processor, cause the apparatus to be configured to:

receive positive data that corresponds to each of a plurality of intentions in a first skill from a skill developer;

generate, based on the positive data, negative data corresponding to each of the intentions based on the positive data that corresponds to each of the intentions;

obtain training data corresponding to a plurality of second skills that is similar to the first skill according to similarity criteria;

obtain a first set from all sets of the training data based on a classification of the first skill, wherein the training data comprises the positive data and the negative data;

sample a preset quantity of pieces of the training data;

obtain the negative data through a manual annotation or according to a clustering algorithm in response to sampling and based on the training data;

perform learning based on the training data and a first basic model, to generate at least one second basic model, wherein the first basic model is preset; and perform learning to generate an intention identification model based on the positive data, the negative data, and the at least one second basic model to train the intention identification model for the first skill, wherein the intention identification model for the first skill is trained using first data that is in the first skill including the positive data, and second data that is out of the first skill including the negative data that corresponds to each intention in the first skill and the training data for the second skills.

9. The apparatus of claim 8, wherein the instructions further cause the apparatus to be configured to:

extract, for each of the intentions, a keyword corresponding to each of the intentions, wherein the keyword is a key feature that affects a weight of the first basic model; and combine keywords corresponding to different intentions or combine the keywords with words that are unrelated to the first skill and obtain combined words for generating at least part of the negative data corresponding to the different intentions.

10. The apparatus of claim 8, wherein the instructions further cause the apparatus to be configured to:

obtain the second skills based on a classification of the first skill or the positive data; and obtain the training data through a sharing layer.

11. The apparatus of claim 8, wherein the instructions further cause the apparatus to be configured to perform learning, using a multi-task learning method based on the training data and the first basic model, to generate the at least one second basic model.

12. The apparatus of claim 8, wherein the instructions further cause the apparatus to be configured to perform learning, using an ensemble learning method based on the positive data, the negative data, and the at least one second basic model, to generate the intention identification model.

13. The apparatus of claim 12, wherein the instructions further cause the apparatus to be configured to:

generate a plurality of intermediate models in a process of generating the intention identification model; and determine that a first generated intermediate model of the plurality of intermediate models is a fastest intention identification model or obtain, by the apparatus, an optimal intention identification model after performing model selection and parameter adjustment on the plurality of intermediate models.

14. The apparatus of claim 13, wherein the instructions further cause the apparatus to be configured to:
- calculate a first accuracy of each of the intermediate models based on the positive data;
- calculate a second accuracy of each of the intermediate models based on the negative data; and
- determine the optimal intention identification model after performing the model selection and the parameter adjustment on the intermediate models based on a first accuracy rate, a second accuracy rate, and a weight from the skill developer.

15. A computer program product comprising computer-executable instructions stored on a non-transitory computer-readable medium that, when executed by a processor, cause an apparatus to:
- receive positive data that corresponds to each of a plurality of intentions in a first skill from a skill developer;
- generate negative data corresponding to each of the intentions based on the positive data that corresponds to each of the intentions;
- obtain training data corresponding to a plurality of second skills that is similar to the first skill according to similarity criteria;
- perform learning based on the training data and a first basic model, to generate at least one second basic model, wherein the first basic model is preset;
- extract, for each of the intentions, a keyword corresponding to each of the intentions, wherein the keyword is a key feature that affects a weight of the first basic model;
- combine keywords corresponding to different intentions or combine the keywords with words that are unrelated to the first skill and obtain combined words for generating at least part of the negative data corresponding to the different intentions; and
- perform learning to generate an intention identification model based on the positive data, the negative data, and the at least one second basic model to train the intention identification model for the first skill, wherein the intention identification model for the first skill is trained using first data that is in the first skill including the positive data, and second data that is out of the first skill including the negative data that corresponds to each intention in the first skill and the training data for the second skills.

16. The computer program product of claim 15, wherein the instructions further cause the apparatus to:
- obtain a first set from all sets of the training data based on a classification of the first skill, wherein the training data comprises the positive data and the negative data;
- sample a preset quantity of pieces of the training data; and
- obtain the negative data through a manual annotation or according to a clustering algorithm in response to sampling and based on the training data.

17. The computer program product of claim 15, wherein the instructions further cause the apparatus to:
- obtain the second skills based on a classification of the first skill or the positive data; and
- obtain the training data through a sharing layer.

18. The intention identification model learning method of claim 1, further comprising training the intention identification model using the training data of a similar voice skill.

19. The apparatus of claim 8, wherein the instructions further cause the apparatus to be configured to:
- perform prediction based on a user statement and the intention identification model to determine a user intention that corresponds to the user statement; and
- determine an application on which a service is provided for a user or a function on the application.

20. The computer program product of claim 15, wherein the first skill is a voice skill for a function of an application, wherein the function is to provide a service in response to a request from a user in a dialog interaction, and wherein the dialog interaction comprises sentences spoken by the user that correspond to intentions in the voice skill.

* * * * *